INVENTOR.
MAURICE MOISE LEVY

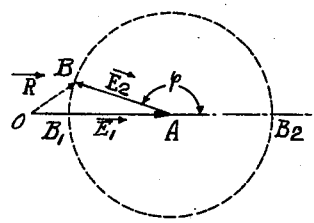
Fig: 1.
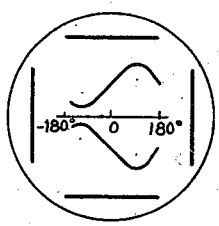
Fig: 2.
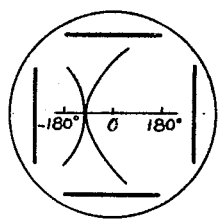
Fig: 4.
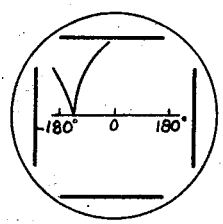
Fig: 5.
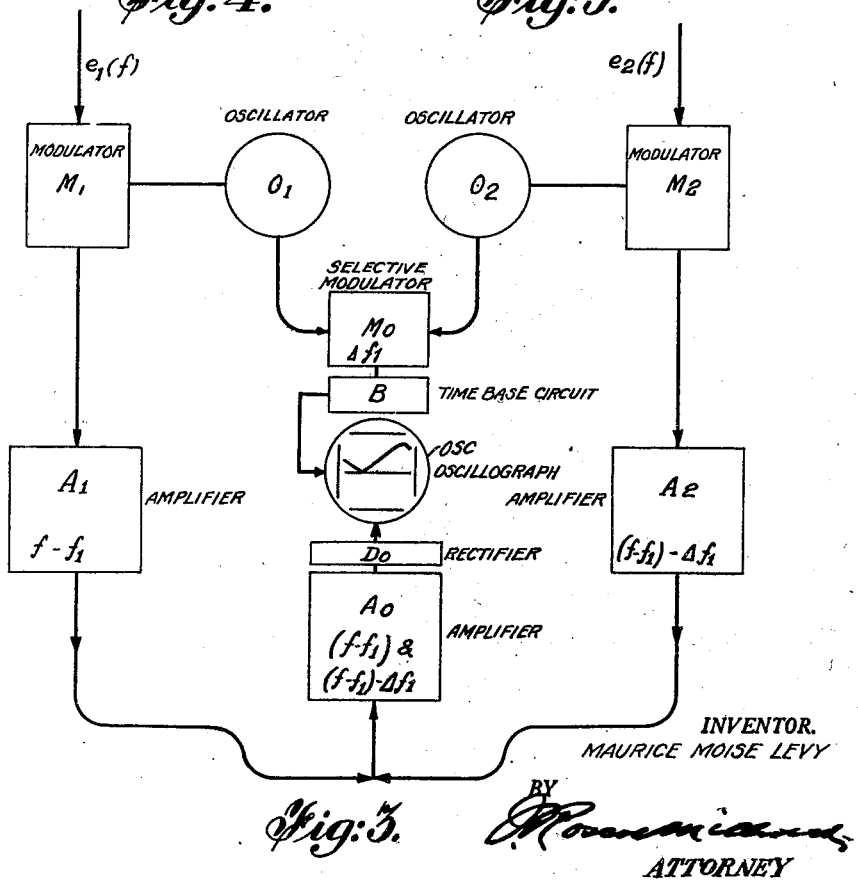
Fig: 3.
INVENTOR.
MAURICE MOISE LEVY
ATTORNEY

Patented Nov. 2, 1943

2,333,322

UNITED STATES PATENT OFFICE 2,333,322

APPARATUS FOR MEASURING PHASE DIFFERENCES AND FOR ANALOGOUS PURPOSES

Maurice Moise Levy, London, England, assignor to International Standard Electric Corporation, New York, N. Y.

Application October 30, 1941, Serial No. 417,178
In France February 22, 1940

4 Claims. (Cl. 172—245)

The present invention relates to apparatus for measuring phase differences.

In accordance with a feature of the invention phase differences may be automatically measured by causing a slight variation in frequency between the two waves under consideration by modulating either one or both of them and by observing on a cathode-ray oscillograph the minimum or maximum position of the envelope of the resultant of the two waves, the sweep circuit of the oscillograph being controlled by the adjusted difference in frequency between the two waves. Calibration may be made experimentally.

The invention will be disclosed in the following specification by making reference to an example of an embodiment described in connection with the drawings included herewith, in which:

Fig. 1 represents a diagram employed in the specification;

Fig. 2 represents an image obtained on the cathode-ray oscillograph;

Fig. 3 represents a schematic assembly of an embodiment;

Figs. 4 and 5 represent two kinds of curves appearing on the cathode-ray oscillograph.

Figure 6:
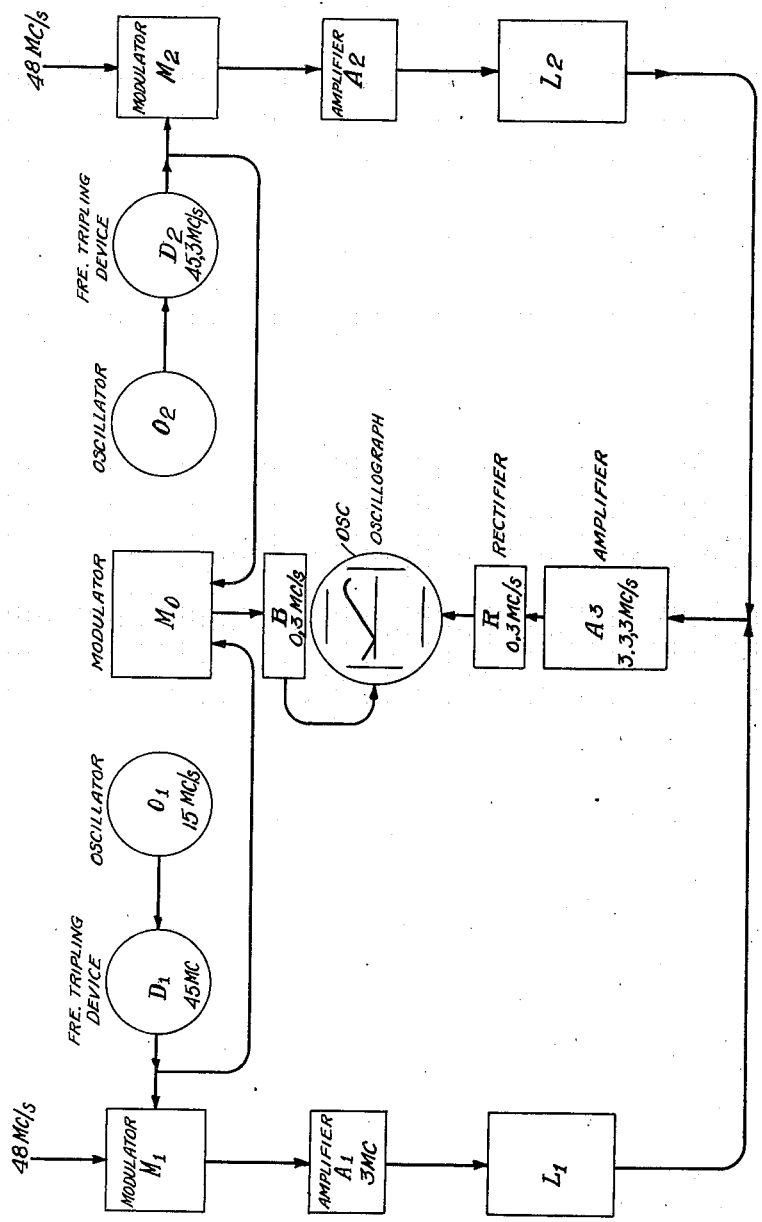
Fig. 6 represents a schematic assembly of an embodiment as applied to measuring distance by determining the phase difference between an emitted wave and its reflection.

Referring to Fig. 1, the vector $$\overrightarrow{E_1} = \overrightarrow{OA}$$

represents the first voltage, and the vector $$\overrightarrow{E_2} = \overrightarrow{AB}$$

a second voltage of the same frequency. These voltages are out of phase an angle $\phi$, the value of which is to be determined by the method and apparatus of the present invention.

The resultant of these two vectors is $$\overrightarrow{OB}$$

which represents the instantaneous sum of the two vectors $E_1$ and $E_2$.

If $\phi$ is varied, the vector AB rotates with respect to OA about the point A in such a way that the angle between the vectors $$\overrightarrow{OA} \text{ and } \overrightarrow{OB}$$

is always representative of $\phi$. The geometric location of the point B is on the circumference of a circle A of radius AB.

It will be seen that if $\phi$ varies progressively, whether increasing or decreasing, the vector $$\overrightarrow{OB}$$

will pass alternatively through a minimum $OB_1$ and through a maximum $OB_2$.

In order to determine the phase displacement $\phi$ the following two operations must be performed:

The frequency of one of the voltages may be changed a small and known amount with reference to the frequency of both waves; as for example by the modulation, so that two voltages corresponding with the two original voltages whose phase difference $\phi$ is to be determined, may then be written as:

$$e_1 \sin (\omega) t$$
$$e_2 \sin (\omega - \Delta\omega) t + \phi$$

These two voltages may be considered as of the same frequency $\omega$ and having a phase difference $(\phi - \Delta\omega t)$ variable with time.

The resultant of these two voltages is applied to one pair of deflection plates on a cathode-ray oscillograph, and a sweep circuit frequency $\Delta\omega$ is applied to the other pair of deflection plates.

The resultant of these two voltages is a minimum for $$\Delta\omega t = \phi \pm (2K+1)\pi$$

and a maximum for $$\Delta\omega t = \phi \pm 2K\pi$$

where K is constant.

On the cathode-ray tube an oscillation having an envelope representing the variations in amplitude of the resultant as a function of the sweep circuit speed $\Delta\omega t$ may be observed. For a particular value of $\Delta\omega t$ this envelope will have a minimum, and for another value a maximum. The position of the minimum or the maximum is a criterion for determining the phase displacement $\phi$.

The tube may be graduated along the horizontal axis in degrees of phase displacement.

Fig. 2 represents a typical path of the oscillographic spot. The amplitude of the wave trace represents the variation in amplitude of the resultant of the two voltages, which as will be clear from the above analysis varies between a minimum and maximum value the position of either of which relative to a datum point on the horizontal axis will determine the phase displacement angle $\phi$. It will also be seen that if the two voltages are of such relative magnitudes that the resultant is not zero for any phase difference, then the minimum amplitude of the wave trace will not at any time meet the horizontal axis. Since the phase difference varies between 0 and 360 degrees symmetrical traces will appear above and below the horizontal line.

An example of a circuit to which features of the invention may be applied is represented in Figs. 3 and 6.

The voltages $e_1$ and $e_2$ are applied, respectively, to two modulators $M_1$ and $M_2$. These modulators are each fed equally by an oscillator $O_1$ for $M_1$ and $O_2$ for $M_2$.

There is a slight difference in frequency $\Delta f_1$ between the frequencies $f_1$ and $f_1+\Delta f_1$ of oscillators $O_1$ and $O_2$, respectively, which will be referred to hereinafter.

Following each modulator a selective amplifier ($A_1$ and $A_2$) is included in the circuit in order to isolate the beat frequency, preferably the beat of the lowest frequency, that is, the lower side frequency for transmission from the amplifier.

The output voltages of these two amplifiers are applied to an amplifier $A_0$ which in turn supplies the resultant complex wave representing these two voltages. This resultant is then applied to a pair of oscillograph deflection plates (preferably the pair controlling vertical deflection).

The voltages of the two oscillators $O_1$ and $O_2$ are applied each equally to a selective modulator $M_0$ which detects the beat frequencies of the two oscillators. Following this modulator a time-base circuit B (producing saw teeth for example) is included in the circuit and synchronized with the beat frequencies of the two oscillators.

The time-base circuit preferably controls horizontal deflection of the cathode-ray spot.

Let $f$ be the frequency of the voltages $e_1$ and $e_2$ and $f_1$ and $f_1+\Delta f_1$ be the frequencies of the local oscillators $O_1$ and $O_2$.

The sweep circuit frequency is $\Delta f_1$.

The following components of frequencies are isolated at the respective outputs of the modulators $M_1$ and $M_2$:

$$f-f_1 \text{ and } f-(f_1+\Delta f_1)$$

with the help of the selective amplifiers $A_1$ and $A_2$.

The amplifier $A_0$ isolates the resultant complex wave consisting of the two components of frequencies $(f-f_1)$ and $(f-f_1)-\Delta f_1$. The amplitude of this resultant is modulated at the frequency $\Delta f_1$.

On the cathode-ray tube a curve appears as set forth above, having a minimum, characteristic of the difference in phase between the two voltages $e_1$ and $e_2$. This phase difference may be read off the face of the tube on a pre-graduated scale.

In order to calibrate the apparatus two voltages $e_1$ and $e_2$ in phase with each other may be, for example, applied to the cathode-ray tube, and the phase displacements produced by the amplifiers $A_1$ and $A_2$ so varied that the maximum or minimum of the envelope will be located in correct position or in a known position.

In order to increase accuracy the sensitivity of the amplifiers $A_1$ and $A_2$ may be varied to make the minimum practically nothing, and the maximum possible voltage should be applied to the tube. An envelope will then be obtained having a point of reversal more sharply defined the greater the sensitivity of the amplifiers.

Fig. 4 represents a curve on the oscillograph under these conditions. The relative sensitivity of the amplifiers $A_1$ and $A_2$ is assumed to have been so adjusted that the resultant of the components of frequencies $(f-f_1)$ and $(f-f_1)-\Delta f_1$ reaches zero once in each cycle of frequency $\Delta f_1$ and moreover the sensitivity of the amplifiers is so great that a voltage sufficient to deflect the spot to its maximum extent will be applied to the vertical deflecting plates before the resultant reaches a maximum. In this manner the point of minimum amplitude of the trace will meet the horizontal datum line and will be sharply defined by flanking portions of steep curvature as shown in Fig. 4.

In order to increase the readability of the envelope curve, the envelope of the resultant may simply be rectified by a rectifier $D_0$ located after the amplifier $A_0$. A curve generally of the shape shown in Fig. 5 will then be obtained since the rectifier $D_0$ will have the effect of cutting out the resultant over 180° of each cycle of frequency $\Delta f_1$.

Fig. 6 represents a circuit of the general character indicated for automatically determining the phase displacement between two 48 megacycle voltages.

The oscillators $O_1$ and $O_2$ of Fig. 3 may each be quartz crystal oscillators, the former having a frequency of 15 megacycles and including a frequency-tripling device $D_1$, and the other having a frequency of 15.1 megacycles and cooperating with a frequency-tripling device $D_2$. The frequencies thus obtained are effectively 45 and 45.3 megacycles and may be applied to the modulators $M_1$ and $M_2$ and to the modulator $M_0$.

At the output end of the selective amplifier $A_1$ a frequency of 3 megacycles is obtained, and at the output end of the selective amplifier $A_2$ a frequency of 3.3 megacycles.

The delay and attenuation lines $L_1$ and $L_2$ permit appropriate compensation to be made for the phase displacement and amplification in the two amplifiers $A_1$ and $A_2$.

The time-base circuit B controlled by the modulator $M_0$, which in turn is fed partly by the oscillator $O_1$ at 45 mc. and the oscillator $O_2$ at 45.3 mc. operates at a frequency of .3 mc. and is applied to the oscillograph OSC.

The resultant frequency of 3 and 3.3 mc., so applied by the circuit $L_1$ and $L_2$ across an amplifier $A_3$ in series with a mixing rectifier R, may apply a resultant of 0.3 mc. to the other deflection plates of the oscillograph.

Although the invention has been described in connection with the above indicated embodiments, it is clear that it is not to be limited thereto and that applications of the present invention are not restrained merely to phase measurement, but may include any apparatus in which a phase measurement is to be used.

The present invention may, for example, be employed for the measurement of the absolute altitude of an airplane located in the field of a transmitter by determining the phase displacement between waves reflected by the airplane and picked up by two receiving antennas and spaced apart one from the other, or for measuring the distance by determining the phase displacement between a wave directed toward the airplane and the wave it reflects back to the receiver, which may, for example, be located in the vicinity of the transmitter. The transmitted wave may or may not be modulated, and in the case where the wave is modulated, the phase displacement of the modulated waves may be measured.

What is claimed is:

1. In a system for indicating the difference in phase between two given waves of the same frequency, two local sources of waves having a predetermined difference of frequency, a first modulator for modulating one of said given waves in accordance with one of said local source waves, a second modulator for modulating the other of said given waves in accordance with the other of said local source waves, means for producing a beat wave of frequency equal to the difference between the frequencies of said local source waves, a cathode ray oscillograph having a beam-spot-indicating screen and two beam deflecting means, one for deflecting the cathode ray beam in a direction at right angles to that of the other, means for transmitting a deflecting wave to a first one of said beam deflecting means in response to the beat wave from said beat producing means, and means for selectively transmitting to the second of said beam deflecting means a complex wave including as components thereof the lower side frequency wave from the output of each said modulator.

2. In a system according to claim 1, the combination in which said means for transmitting a deflecting wave to said first deflecting means, includes means for producing a saw tooth wave in response to the beat wave from said beat wave producing means and for transmitting said saw tooth wave to said first deflecting means.

3. In a system according to claim 1, rectifying means responsive to said complex wave for preventing the transmission to said second deflecting means, of that part of said complex wave located on one side of the zero axis of said wave.

4. In a system according to claim 1, the combination in which each of said two local sources of waves includes a crystal controlled oscillator and means for multiplying the frequency of the output wave of said oscillator, each said frequency multiplying means having its output coupled to one of said modulators.

MAURICE MOISE LEVY